(12) United States Patent
Luo et al.

(10) Patent No.: US 12,177,452 B2
(45) Date of Patent: Dec. 24, 2024

(54) INTER PREDICTION BANDWIDTH REDUCTION METHOD WITH OPTICAL FLOW COMPENSATION

(71) Applicant: Vid Scale, Inc., Wilmington, DE (US)

(72) Inventors: Jiancong Luo, Skillman, NJ (US); Yuwen He, San Diego, CA (US); Wei Chen, San Diego, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 250 days.

(21) Appl. No.: 17/439,760

(22) PCT Filed: Mar. 16, 2020

(86) PCT No.: PCT/US2020/022945
§ 371 (c)(1),
(2) Date: Sep. 15, 2021

(87) PCT Pub. No.: WO2020/190853
PCT Pub. Date: Sep. 24, 2020

(65) Prior Publication Data
US 2022/0132136 A1    Apr. 28, 2022

Related U.S. Application Data

(60) Provisional application No. 62/819,529, filed on Mar. 16, 2019.

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/117* (2014.11);
(Continued)

(58) Field of Classification Search
CPC ............... H04N 19/137; H04N 19/105; H04N 19/117; H04N 19/132; H04N 19/176;
(Continued)

(56) References Cited

U.S. PATENT DOCUMENTS 9,325,991 B2 * 4/2016 Seregin ................ H04N 19/523
10,904,565 B2 * 1/2021 Chuang ................ H04N 19/583
(Continued)

OTHER PUBLICATIONS

Luo, Jiancong, et. al., "CE2-Related: Prediction Refinement With Optical Flow For Affine Mode". Joint Video Exploration Team (JVET) ISO/IEC JTC1/SC29/WG11 and ITU-T SG.16, JVET-N0236, Mar. 14, 2019.
(Continued)

*Primary Examiner* — Boubacar Abdou Tchoussou
(74) *Attorney, Agent, or Firm* — Klintworth & Rozenblat IP LLP

(57) ABSTRACT

Systems and methods are described for video coding. In some embodiments, inter prediction of a sample in a current block is performed by rounding an initial motion vector and determining a rounding error vector caused by the rounding. An unrefined prediction of the sample is generated using the rounded motion vector. Unrefined predictions are similarly generated for other samples in the current block. Based on the unrefined predictions, a spatial gradient is determined for each sample position in the block. A refined prediction is generated for each sample position by adding, to the unrefined prediction, a scalar product between the spatial gradient and the rounding error vector at the sample position. Example methods can reduce the number of reference pixels used to predict a current block and thus may reduce memory access bandwidth.

20 Claims, 11 Drawing Sheets

(51) Int. Cl.
*H04N 19/117* (2014.01)
*H04N 19/132* (2014.01)
*H04N 19/176* (2014.01)
*H04N 19/82* (2014.01)

(52) U.S. Cl.
CPC ......... *H04N 19/132* (2014.11); *H04N 19/176* (2014.11); *H04N 19/82* (2014.11)

(58) Field of Classification Search
CPC .... H04N 19/82; H04N 19/433; H04N 19/523; H04N 19/517
See application file for complete search history.

(56) References Cited

U.S. PATENT DOCUMENTS

| | | | | |
|---|---|---|---|---|
| 11,277,624 | B2* | 3/2022 | Zhang | H04N 19/107 |
| 11,451,819 | B2* | 9/2022 | Liu | H04N 19/105 |
| 2013/0272410 | A1 | 10/2013 | Seregin | |
| 2015/0195562 | A1* | 7/2015 | Li | H04N 19/56 375/240.16 |
| 2017/0214932 | A1* | 7/2017 | Huang | H04N 19/537 |
| 2018/0316929 | A1* | 11/2018 | Li | H04N 19/52 |
| 2020/0221117 | A1* | 7/2020 | Liu | H04N 19/56 |
| 2020/0296405 | A1* | 9/2020 | Huang | H04N 19/137 |
| 2021/0067783 | A1* | 3/2021 | Liu | H04N 19/132 |
| 2021/0211716 | A1* | 7/2021 | Zhang | H04N 19/577 |
| 2022/0103827 | A1* | 3/2022 | Liu | H04N 19/513 |

OTHER PUBLICATIONS

Chen, J., et al., "Algorithm description for Versatile Video Coding and Test Model 4 (VTM 4)". Joint Video Exploration Team (JVET) ISO/IEC JTC1/SC29/WG11 and ITU-T SG.16, JVET-M1002, Feb. 16, 2019.

Luo, J., et al., "CE2: Adaptive Precision for Affine MVD Coding (Test 2.1.1)". Joint Video Exploration Team (JVET) ISO/IEC JTC1/SC29/WG11 and ITU-T SG.16, JVET-M0420, Jan. 3, 2019.

International Preliminary Report on Patentability for PCT/US20/22945 issued on Sep. 16, 2021, (7 pages).

International Search Report and Written Opinion of the International Searching Authority for PCT/US2020/022945 issued on Jun. 5, 2020 (11 pages).

International Telecommunication Union, "Advanced Video Coding for Generic Audiovisual Services". Series H: Audiovisual and Multimedia System; Infrastructure of audiovisual services, Coding of moving video, ITU-T Recommendation H.264, ISO/IEC/MPEG 4 Part 10, Nov. 2007, 564 pages.

SMPTE 421M, "VC-1 Compressed Video Bitstream Format and Decoding Process". SMPTE Standard, 2006, (493 pages).

Benjamin, et. al., "High Efficiency Video Coding (HEVC) Text Specification Draft 10 (for FDIS and Last Call)". Joint Collaborative Team on Video Coding (JCT-VC), Document No. JCTVC-L1003, Jan. 2013, 310 pages.

Segall, Andrew, et al., "Joint Call for Proposals on Video Compression with Capability beyond HEVC". Joint Video Exploration Team (JVET) of ITU-T SG 16 WP 3 and ISO/IEC JTC 1/SC 29/WG 11, JVET-H1002, Oct. 18-24, 2017 (28 pages).

Bross, Benjamin, et al. "Versatile Video Coding (Draft 4)". Joint Video Experts Team (JVET) of ITU-T SG 16 WP 3 and ISO/IEC JTC 1/SC 29/WG 11, Document No. JVET-M1001, 13th Meeting: Marrakech, MA, Jan. 9-18, 2019 (267 pages).

Chen, Jianle, et al. "Algorithm Description of Joint Exploration Test Model 7 (JEM 7)". Joint Video Exploration Team (JVET) of ITU-T SG 16 WP 3 and ISO/IEC JTC 1/SC 29/WG 11, Document No. JVET-G1001-v1, 7th Meeting: Torino, IT, Jul. 13-21, 2017 (51 pages).

Wikipedia, "Sobel Filter". Wikipedia web article available at: https://en.wikipedia.org/w/index.php?title=Sobel_operator&oldid=837616168, updated on Apr. 21, 2018, 9 pages.

* cited by examiner

INTER PREDICTION BANDWIDTH REDUCTION METHOD WITH OPTICAL FLOW COMPENSATION

CROSS-REFERENCE TO RELATED APPLICATIONS

The present application is a national stage application under 35 U.S.C. 371 of International Application No. PCT/US2020/022945, entitled "INTER PREDICTION BANDWIDTH REDUCTION METHOD WITH OPTICAL FLOW COMPENSATION" filed on Mar. 16, 2020, which claims benefit under 35 U.S.C. § 119 (e) from [,] U.S. Provisional Patent Application No. 62/819,529, entitled "INTER PREDICTION BANDWIDTH REDUCTION METHOD WITH OPTICAL FLOW COMPENSATION," filed Mar. 16, 2019, which is incorporated herein by reference in its entirety.

BACKGROUND

Video coding systems are widely used to compress digital video signals to reduce the storage need and/or transmission bandwidth of such signals. Among the various types of video coding systems, such as block-based, wavelet-based, and object-based systems, nowadays block-based hybrid video coding systems are the most widely used and deployed. Examples of block-based video coding systems include international video coding standards such as the MPEG-1/2/4 part 2, H.264/MPEG-4 part 10 AVC, VC-1, and the latest video coding standard called High Efficiency Video Coding (HEVC), which was developed by JCT-VC (Joint Collaborative Team on Video Coding) of ITU-T/SG16/Q.6/VCEG and ISO/IEC/MPEG.

In October 2017, a joint call for proposals (CfP) on video compression with capability beyond HEVC was issued by ITU-T and ISO/IEC. In April 2018, CfP responses for standard dynamic range category were received and evaluated at the 10-th JVET meeting, demonstrating a compression efficiency gain over HEVC around 40%. Based on such evaluation results, the Joint Video Expert Team (JVET) launched a new project to develop the new generation video coding standard named Versatile Video Coding (VVC). In the same month, a reference software codebase, called VVC test model (VTM), was established for demonstrating a reference implementation of the WC standard. For the initial VTM-1.0, most of coding modules, including intra prediction, inter prediction, transform/inverse transform and quantization/de-quantization, and in-loop filters follow the existing HEVC design, with an exception that a multi-type tree-based block partitioning structure is used in the VTM. Meanwhile, to facilitate the assessment of new coding tools, another reference software base called benchmark set (BMS) was also generated. In the BMS codebase, a list of coding tools inherited from JEM, which provides higher coding efficiency and moderate implementation complexity, are included on top of the VTM and used as the benchmark when evaluating similar coding technologies during the WC standardization process. Specifically, there are 9 JEM coding tools integrated in the BMS-1.0, including 65 angular intra prediction directions, modified coefficient coding, advanced multiple transform (AMT)+4×4 non-separable secondary transform (NSST), affine motion model, generalized adaptive loop filter (GALF), advanced temporal motion vector prediction (ATMVP), adaptive motion vector precision, decoder-side motion vector refinement (DMVR) and linear model (LM) chroma mode.

SUMMARY

Embodiments described herein include methods that are used in video encoding and decoding (collectively "coding").

In some embodiments, a method includes rounding a first motion vector associated with a current sample to obtain a second motion vector; obtaining an unrefined prediction of the current sample using the second motion vector; obtaining a rounding error vector indicative of a difference between the first motion vector and the second motion vector; obtaining a spatial gradient at a sample position of the current sample; and obtaining a refined prediction of the current sample based on the unrefined prediction, the spatial gradient, and the rounding error vector. Some embodiments include an apparatus comprising one or more processors configured to perform such a method or other methods described herein.

In some embodiments, the refined prediction of the current sample is obtained by adding, to the unrefined prediction, a scalar product between the spatial gradient and the rounding error vector.

In some embodiments, the second motion vector is rounded to integer precision. In some embodiments, the second motion vector is rounded to a fractional precision.

In some embodiments, the first motion vector is a sub-block motion vector for a sub-block containing the current sample, and the first motion vector is obtained using an affine motion model.

In some embodiments, the first motion vector is a translational motion vector associated with a current block containing the current sample.

In some embodiments, obtaining the spatial gradient at a sample position of the current sample is performed based on unrefined predictions of a plurality of samples neighboring the current sample. In some such embodiments, a horizontal component of the spatial gradient is obtained as a difference between a right-neighboring sample and a left-neighboring sample of the current sample, and a vertical component of the spatial gradient is obtained as a difference between a top-neighboring sample and a bottom-neighboring sample of the current sample.

In some embodiments, obtaining the unrefined prediction of the current sample is performed using a four-tap interpolation filter.

In some embodiments, obtaining the unrefined prediction of the current sample is performed using a bilinear interpolation filter.

In some embodiments, a determination to perform rounding of the first motion vector is made based on a size of a current block including the current sample. In some such embodiments, a determination to perform rounding of the first motion vector is made based on a determination that a current block including the current sample is a 4×4, 4×8, or 8×4 block.

In some embodiments, the first motion vector is signaled in a bitstream.

In some embodiments, the refined prediction of the current sample is subtracted from an input sample value to generate a prediction residual, and the prediction residual is encoded in a bitstream.

In some embodiments, a prediction residual for the current sample is decoded from a bitstream and added to the refined prediction of the current sample to generate a reconstructed sample value.

One or more of the present embodiments also provide a computer readable storage medium having stored thereon instructions for performing bi-directional optical flow, encoding or decoding video data according to any of the methods described above. The present embodiments also provide a computer readable storage medium having stored thereon a bitstream generated according to the methods described above. The present embodiments also provide a method and apparatus for transmitting the bitstream generated according to the methods described above. The present embodiments also provide a computer program product including instructions for performing any of the methods described.

In additional embodiments, encoder and decoder apparatus are provided to perform the methods described herein. An encoder or decoder apparatus may include a processor configured to perform the methods described herein. The apparatus may include a computer-readable medium (e.g. a non-transitory medium) storing instructions for performing the methods described herein. In some embodiments, a computer-readable medium (e.g. a non-transitory medium) stores a video encoded using any of the methods described herein.

EXAMPLE NETWORKS AND SYSTEMS FOR IMPLEMENTATION OF THE EMBODIMENTS

Figure 1A:
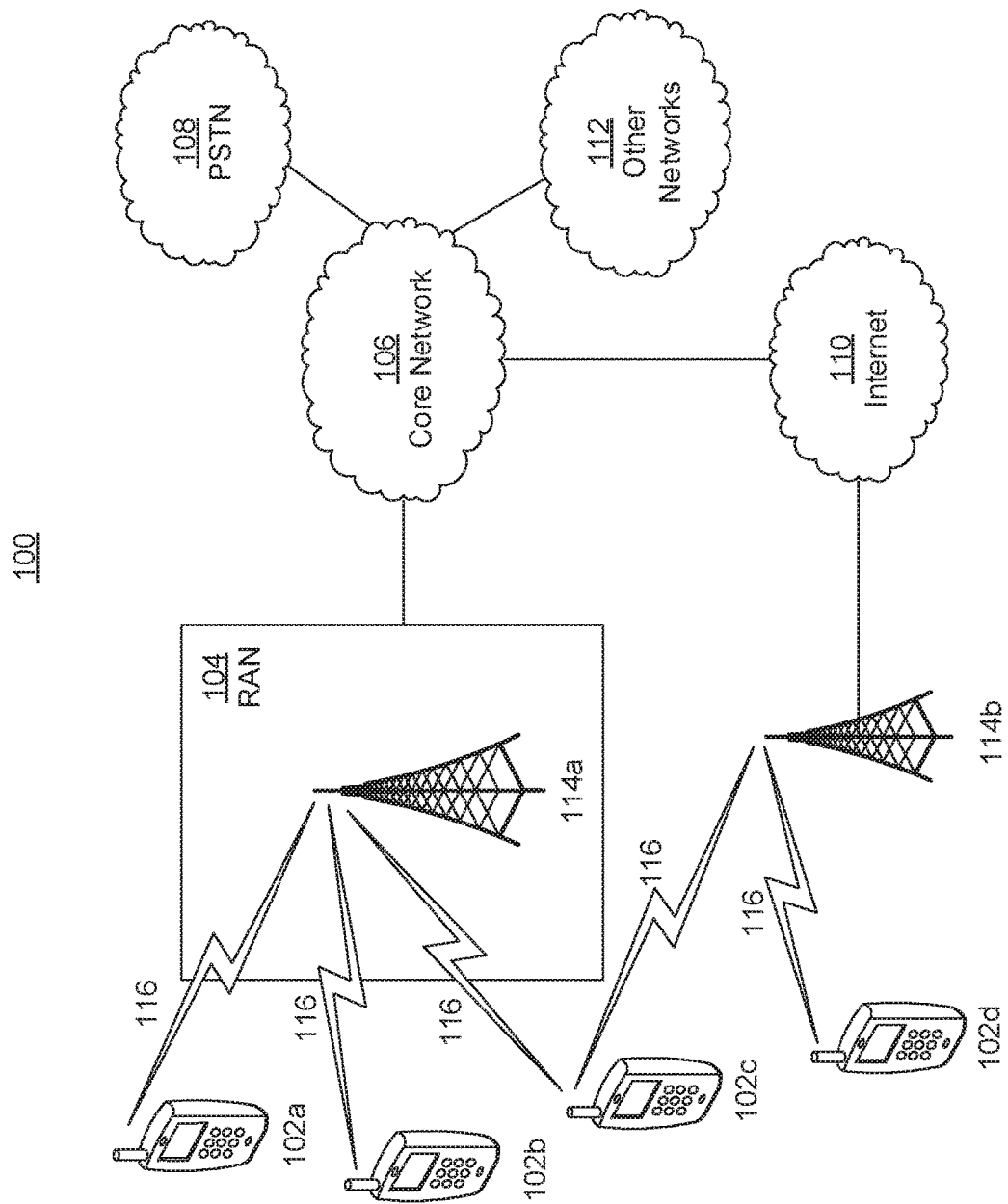
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104, a CN 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
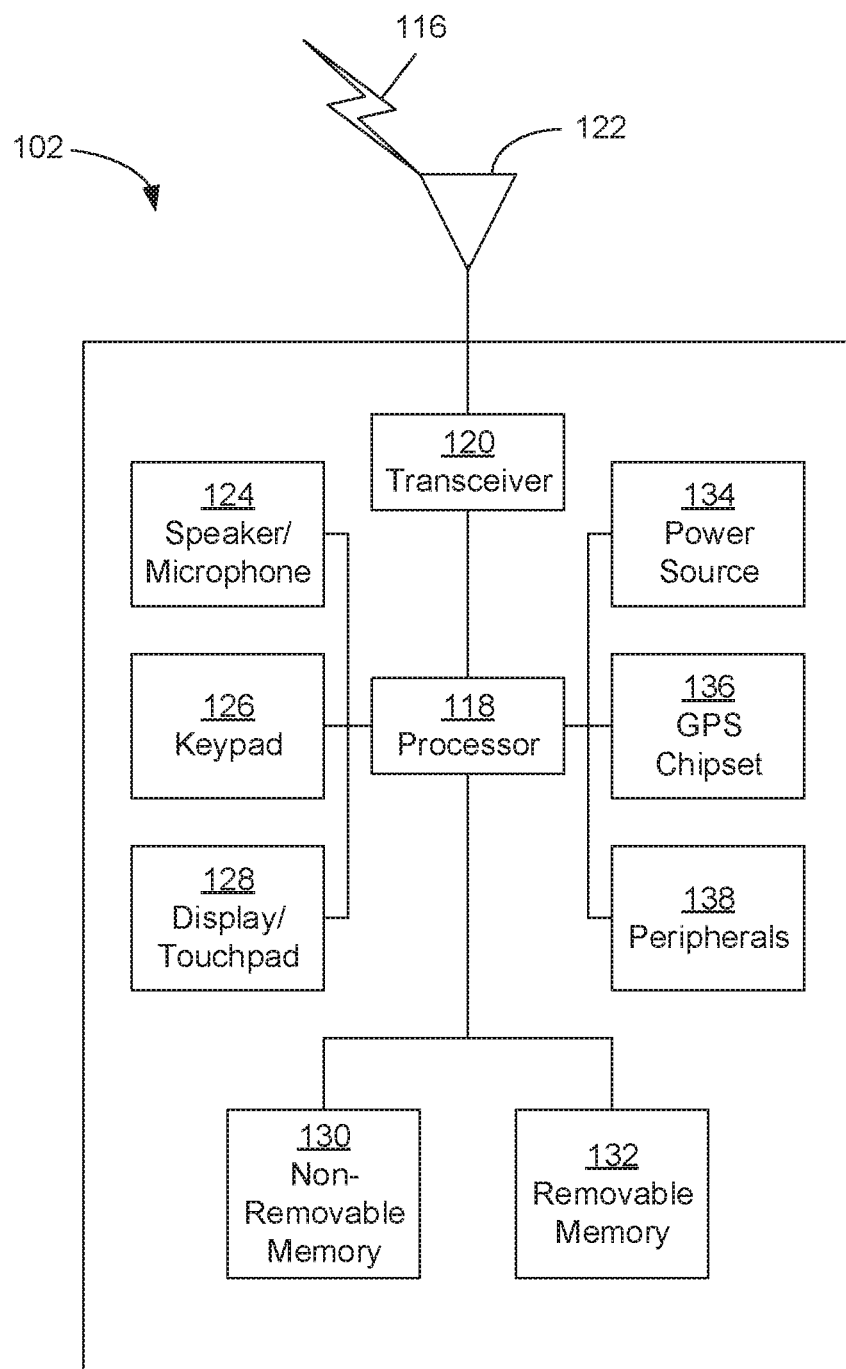
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Although the WTRU is described in FIGS. 1A-1B as a wireless terminal, it is contemplated that in certain representative embodiments that such a terminal may use (e.g., temporarily or permanently) wired communication interfaces with the communication network.

In representative embodiments, the other network 112 may be a WLAN.

In view of FIGS. 1A-1B, and the corresponding description, one or more, or all, of the functions described herein may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Example Systems.

Figure 10:
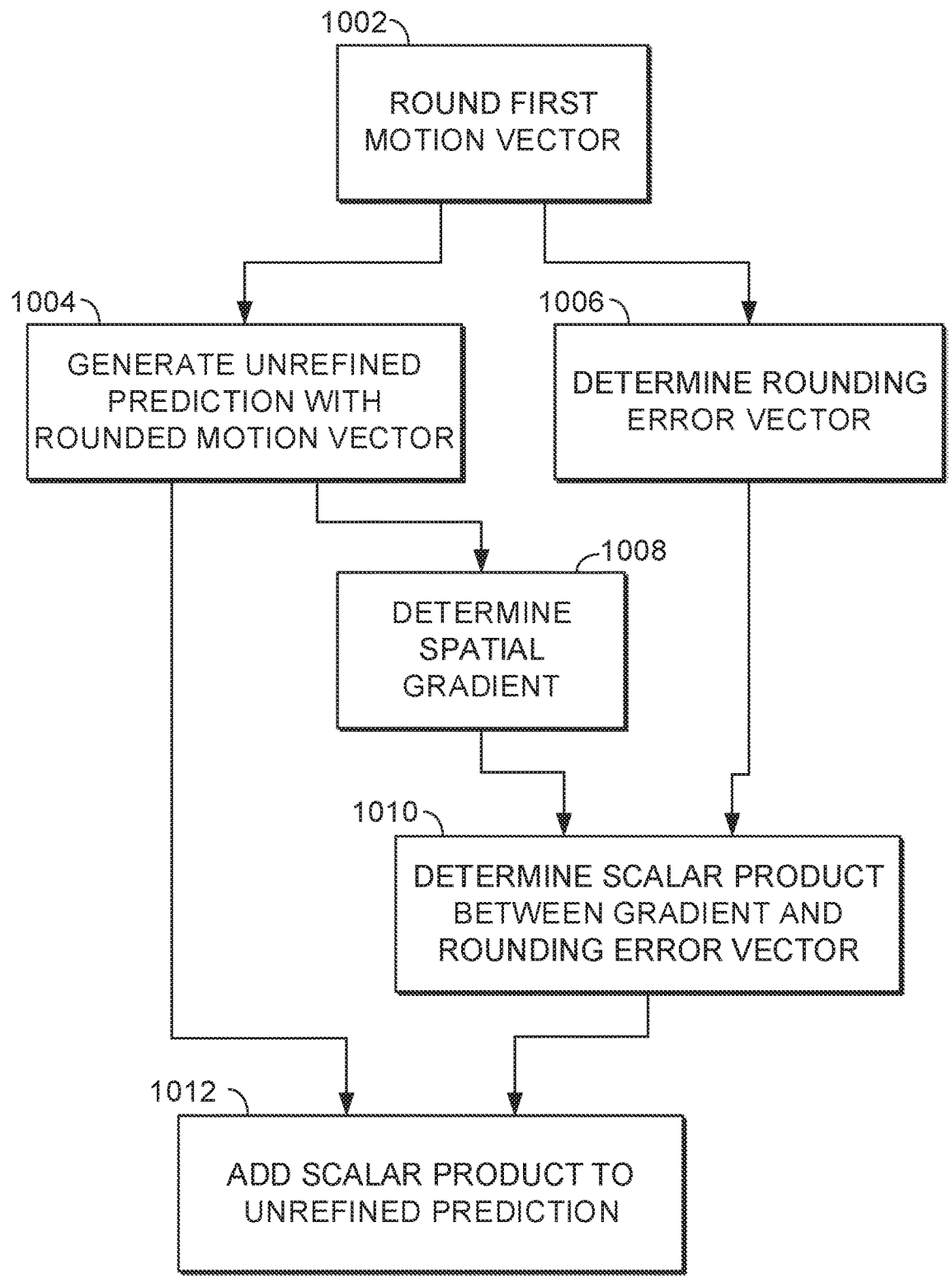
FIG. 10 is a flow diagram illustrating a method performed in some embodiments.

FIG. 10 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or WC (Versatile Video Coding, a new standard being developed by JVET, the Joint Video Experts Team).

Figure 1C:
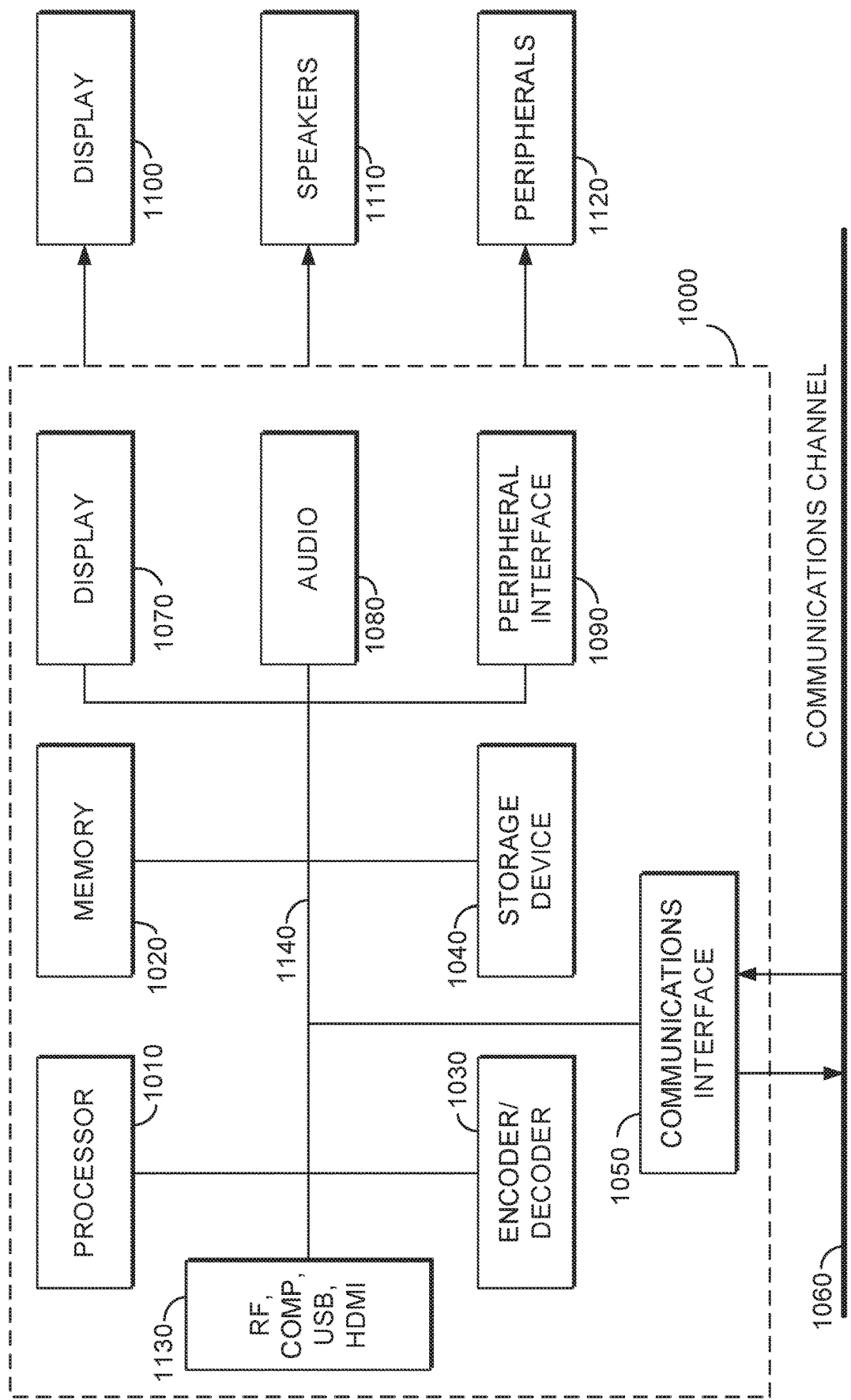
FIG. 1C is a functional block diagram of a system according to some embodiments.

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 1C, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

DETAILED DESCRIPTION

Block-Based Video Coding.

Figure 2A:
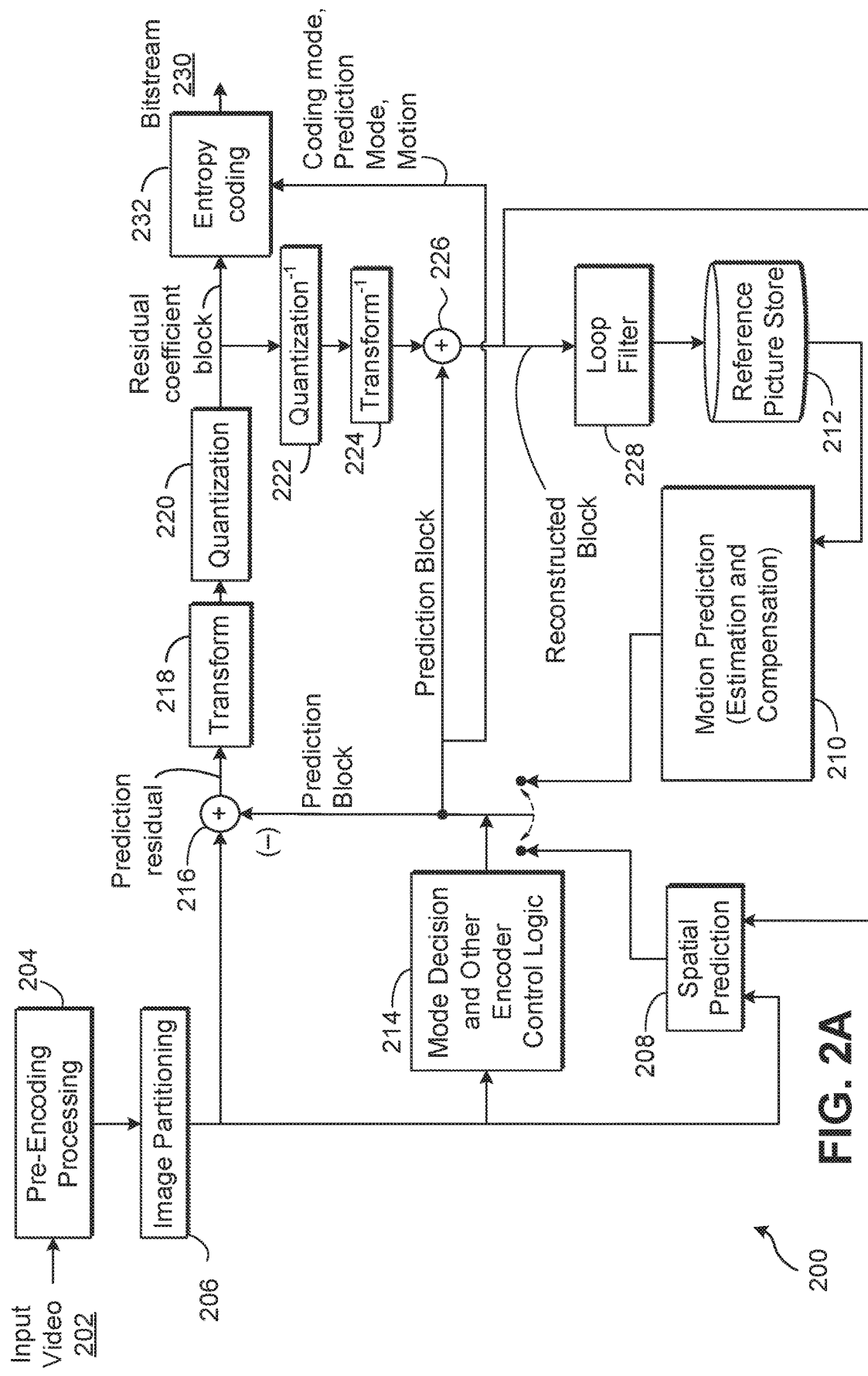
FIG. 2A is a functional block diagram of block-based video encoder, such as an encoder used for WC.

Like HEVC, VVC is built upon the block-based hybrid video coding framework. FIG. 2A gives the block diagram of a block-based hybrid video encoding system 200. Variations of this encoder 200 are contemplated, but the encoder 200 is described below for purposes of clarity without describing all expected variations.

Before being encoded, a video sequence may go through pre-encoding processing (204), for example, applying a color transform to an input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

The input video signal 202 including a picture to be encoded is partitioned (206) and processed block by block in units of, for example, CUs. Different CUs may have different sizes. In VTM-1.0, a CU can be up to 128×128 pixels. However, different from the HEVC which partitions blocks only based on quad-trees, in the VTM-1.0, a coding tree unit (CTU) is split into CUs to adapt to varying local characteristics based on quad/binary/ternary-tree. Additionally, the concept of multiple partition unit type in the HEVC is removed, such that the separation of CU, prediction unit (PU) and transform unit (TU) does not exist in the VVC-1.0 anymore; instead, each CU is always used as the basic unit for both prediction and transform without further partitions. In the multi-type tree structure, a CTU is firstly partitioned by a quad-tree structure. Then, each quad-tree leaf node can be further partitioned by a binary and ternary tree structure. Different splitting types may be used, such as quaternary partitioning, vertical binary partitioning, horizontal binary partitioning, vertical ternary partitioning, and horizontal ternary partitioning.

In the encoder of FIG. 2A, spatial prediction (208) and/or temporal prediction (210) may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. A temporal prediction signal for a given CU may be signaled by one or more motion vectors (MVs) which indicate the amount and the direction of motion between the current CU and its temporal reference. Also, if multiple reference pictures are supported, a reference picture index may additionally be sent, which is used to identify from which reference picture in the reference picture store (212) the temporal prediction signal comes.

The mode decision block (214) in the encoder chooses the best prediction mode, for example based on a rate-distortion optimization method. This selection may be made after spatial and/or temporal prediction is performed. The intra/inter decision may be indicated by, for example, a prediction mode flag. The prediction block is subtracted from the current video block (216) to generate a prediction residual. The prediction residual is de-correlated using transform (218) and quantized (220). (For some blocks, the encoder may bypass both transform and quantization, in which case the residual may be coded directly without the application of the transform or quantization processes.) The quantized residual coefficients are inverse quantized (222) and inverse transformed (224) to form the reconstructed residual, which is then added back to the prediction block (226) to form the reconstructed signal of the CU. Further in-loop filtering, such as deblocking/SAO (Sample Adaptive Offset) filtering, may be applied (228) on the reconstructed CU to reduce encoding artifacts before it is put in the reference picture store (212) and used to code future video blocks. To form the output video bit-stream 230, coding mode (inter or intra), prediction mode information, motion information, and quantized residual coefficients are all sent to the entropy coding unit (108) to be further compressed and packed to form the bit-stream.

Figure 2B:
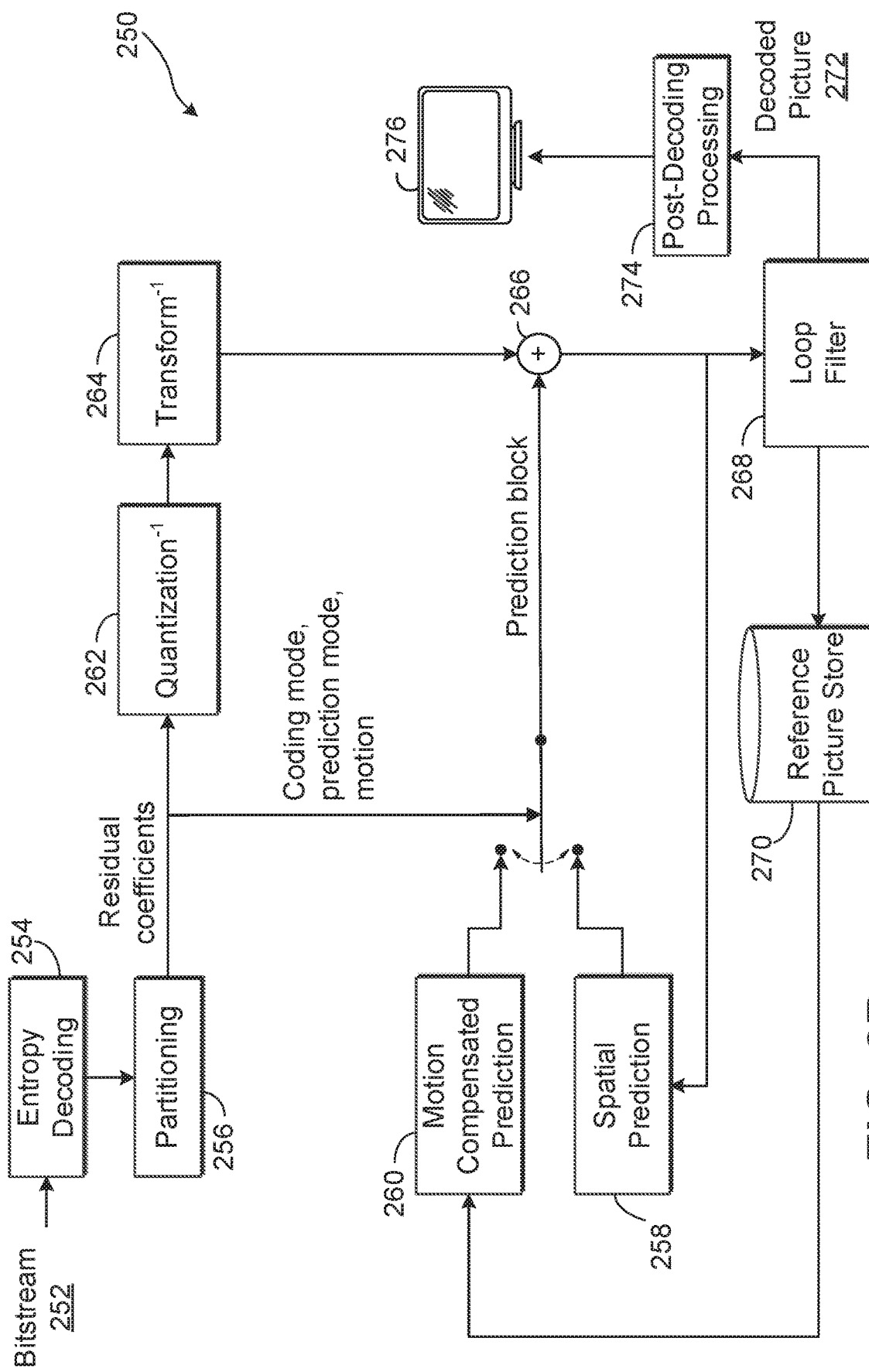
FIG. 2B is a functional block diagram of a block-based video decoder, such as a decoder used for VVC.

FIG. 2B gives a block diagram of a block-based video decoder 250. In the decoder 250, a bitstream is decoded by the decoder elements as described below. Video decoder 250 generally performs a decoding pass reciprocal to the encoding pass as described in FIG. 2A. The encoder 200 also generally performs video decoding as part of encoding video data.

In particular, the input of the decoder includes a video bitstream 252, which can be generated by video encoder 200. The video bit-stream 252 is first unpacked and entropy decoded at entropy decoding unit 254 to obtain transform coefficients, motion vectors, and other coded information. Picture partition information indicates how the picture is partitioned. The decoder may therefore divide (256) the picture according to the decoded picture partitioning information. The coding mode and prediction information are sent to either the spatial prediction unit 258 (if intra coded) or the temporal prediction unit 260 (if inter coded) to form the prediction block. The residual transform coefficients are sent to inverse quantization unit 262 and inverse transform unit 264 to reconstruct the residual block. The prediction block and the residual block are then added together at 266 to generate the reconstructed block. The reconstructed block may further go through in-loop filtering 268 before it is stored in reference picture store 270 for use in predicting future video blocks.

The decoded picture 272 may further go through post-decoding processing (274), for example, an inverse color transform (e.g. conversion from YCbCr 4:2:0 to RGB 4:4:4) or an inverse remapping performing the inverse of the remapping process performed in the pre-encoding processing (204). The post-decoding processing can use metadata derived in the pre-encoding processing and signaled in the bitstream. The decoded, processed video may be sent to a display device 276. The display device 276 may be a separate device from the decoder 250, or the decoder 250 and the display device 276 may be components of the same device.

Various methods and other aspects described in this disclosure can be used to modify modules of a video encoder 200 or decoder 250. Moreover, the systems and methods disclosed herein are not limited to VVC or HEVC, and can be applied, for example, to other standards and recommendations, whether pre-existing or future-developed, and extensions of any such standards and recommendations (including WC and HEVC). Unless indicated otherwise, or technically precluded, the aspects described in this disclosure can be used individually or in combination.
Inter Prediction.

Figure 3:
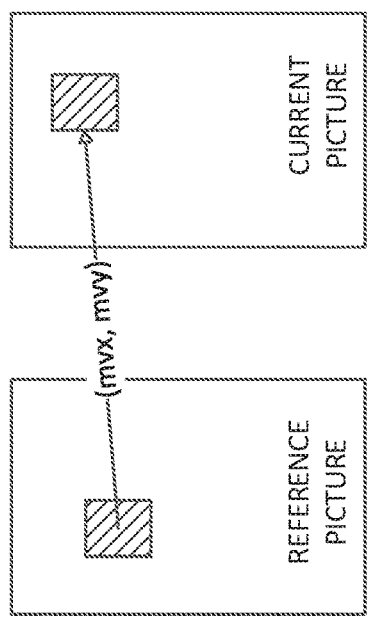
FIG. 3 is a diagram illustrating an example of motion compensated prediction.
Figure 4:
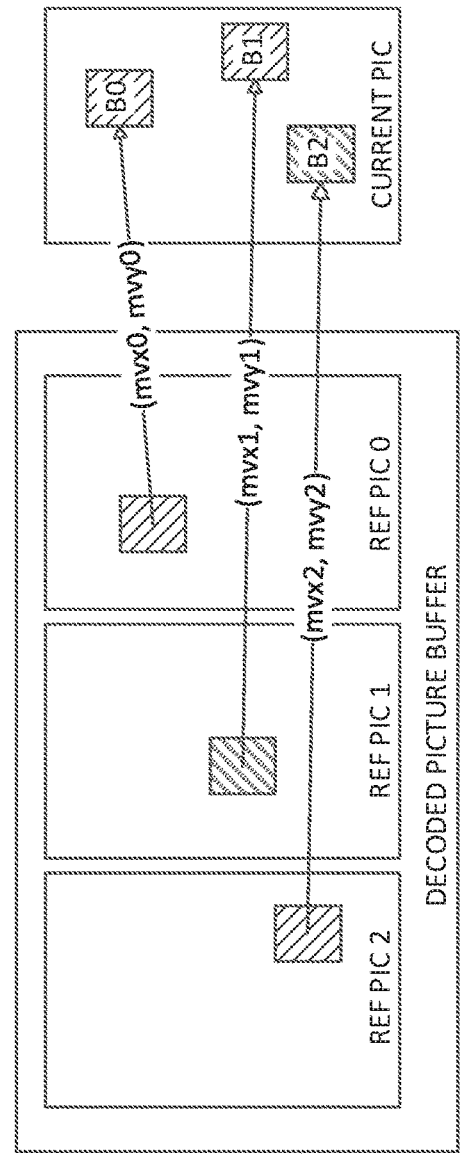
FIG. 4 is a diagram illustrating an example of block-level movement within a picture.

FIG. 3 and FIG. 4 are diagrams illustrating examples of motion compensated prediction of video blocks (e.g., using motion compensation modules 210 or 260). FIG. 4, which illustrates an example of block-level movement within a picture, is a diagram illustrating an example decoded picture buffer including, for example, reference pictures "Ref pic 0," "Ref pic 1," and "Ref pic2." The blocks B0, B1, and B2 in a current picture may be predicted from blocks in reference pictures "Ref pic 0," "Ref pic 1," and "Ref pic2" respectively. Motion prediction may use video blocks from neighboring video frames to predict the current video block. Motion prediction may exploit temporal correlation and/or remove temporal redundancy inherent in the video signal. For example, in H.264/AVC and HEVC, temporal prediction may be performed on video blocks of various sizes (e.g., for the luma component, temporal prediction block sizes may vary from 16×16 to 4×4 in H.264/AVC, and from 64×64 to 4×4 in HEVC). With a motion vector of (mvx, mvy), a temporal prediction may be performed as follows:

$$P(x,y) = \text{ref}(x-mvx, y-mvy)$$

where ref(x,y) may be a pixel value at location (x, y) in the reference picture, and P(x,y) may be the predicted block. A video coding system may support inter-prediction with fractional pixel precision. When a motion vector (mvx, mvy) has fractional pixel value, one or more interpolation filters may be applied to obtain the pixel values at fractional pixel positions. Block based video coding systems may use multi-hypothesis prediction to improve temporal prediction, for example, where a prediction signal may be formed by combining a number of prediction signals from different reference pictures. For example, H.264/AVC and/or HEVC may use bi-prediction that may combine two prediction signals. Bi-prediction may combine two prediction signals, each from a reference picture, to form a prediction, such as in the following equation:

$$P(x, y) = \frac{P_0(x, y) + P_1(x, y)}{2} = \frac{ref_0(x - mvx_0, y - mvy_0) + ref_1(x - mvx_1, y - mvy_1)}{2}$$

where $P_0(x,y)$ and $P_1(x,y)$ may be the first and the second prediction block, respectively. As illustrated in this equation, the two prediction blocks may be obtained by performing motion-compensated prediction from two reference pictures $ref_0(x, y)$ and $ref_1(x, y)$, with two motion vectors ($mvx_0$, $mvy_0$) and ($mvx_1$, $mvy_1$) respectively. The prediction block P(x, y) may be subtracted from the source video block (e.g., at 216) to form a prediction residual block. The prediction residual block may be transformed (e.g., at transform unit 218) and/or quantized (e.g., at quantization unit 220). The quantized residual transform coefficient blocks may be sent to an entropy coding unit (e.g., entropy coding unit 232) to be entropy coded to reduce bit rate. The entropy coded residual coefficients may be packed to form part of an output video bitstream (e.g., bitstream 230).
Coded Bitstream Structure.

Figure 5:
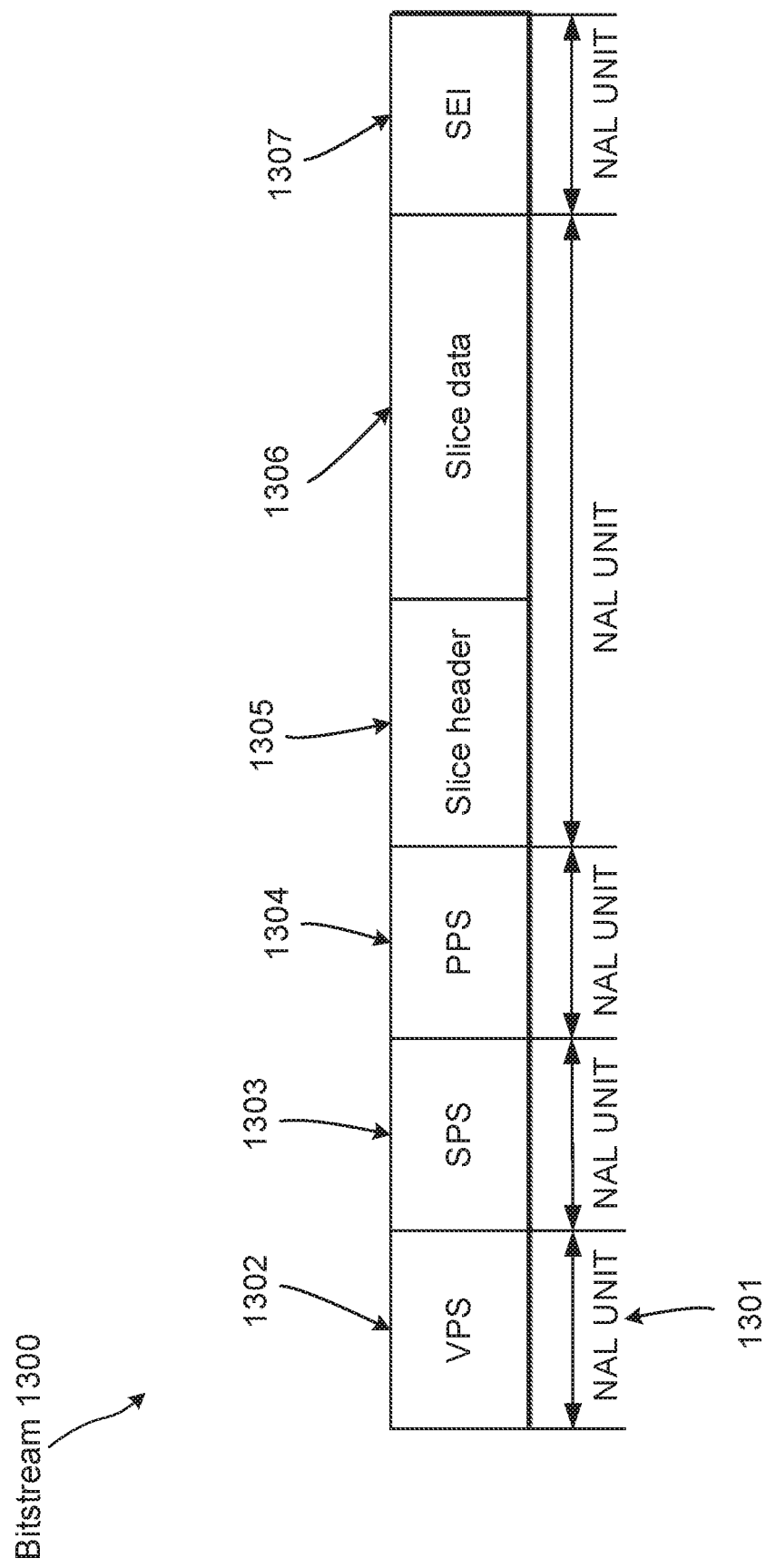
FIG. 5 is a diagram illustrating an example of a coded bitstream structure.

FIG. 5 is a diagram illustrating an example of a coded bitstream structure. A coded bitstream 1300 consists of a number of NAL (Network Abstraction Layer) units 1301. A NAL unit may contain coded sample data such as coded slice 1306, or high level syntax metadata such as parameter set data, slice header data 1305 or supplemental enhancement information data 1307 (which may be referred to as an SEI message). Parameter sets are high level syntax structures containing essential syntax elements that may apply to multiple bitstream layers (e.g. video parameter set 1302 (VPS)), or may apply to a coded video sequence within one layer (e.g. sequence parameter set 1303 (SPS)), or may apply to a number of coded pictures within one coded video sequence (e.g. picture parameter set 1304 (PPS)). The parameter sets can be either sent together with the coded pictures of the video bit stream, or sent through other means (including out-of-band transmission using reliable channels, hard coding, etc.). Slice header 1305 is also a high level syntax structure that may contain some picture-related information that is relatively small or relevant only for certain slice or picture types. SEI messages 1307 carry the information that may not be needed by the decoding process but can be used for various other purposes such as picture output timing or display as well as loss detection and concealment.
Communication Devices and Systems.

Figure 6:
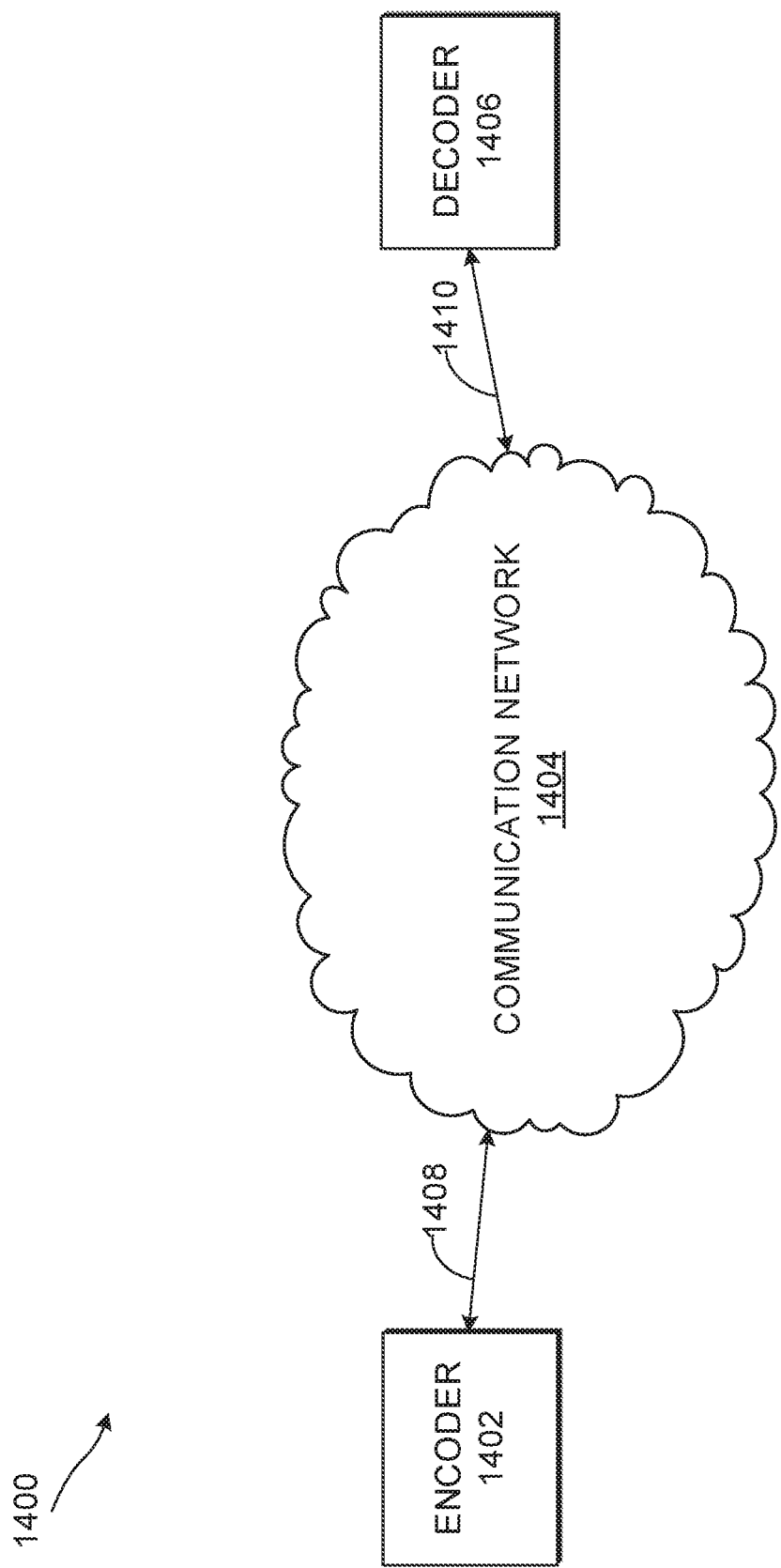
FIG. 6 is a diagram illustrating an example communication system.

FIG. 6 is a diagram illustrating an example of a communication system. The communication system 1400 may comprise an encoder 1402, a communication network 1404, and a decoder 1406. The encoder 1402 may be in communication with the network 1404 via a connection 1408, which may be a wireline connection or a wireless connection. The encoder 1402 may be similar to the block-based video encoder of FIG. 2A. The encoder 1402 may include a single layer codec (e.g., FIG. 2A) or a multilayer codec. The decoder 1406 may be in communication with the network 1404 via a connection 1410, which may be a wireline connection or a wireless connection. The decoder 1406 may be similar to the block-based video decoder of FIG. 2B. The decoder 1406 may include a single layer codec (e.g., FIG. 2B) or a multilayer codec.

The encoder 1402 and/or the decoder 1406 may be incorporated into a wide variety of wired communication devices and/or wireless transmit/receive units (WTRUs), such as, but not limited to, digital televisions, wireless broadcast systems, a network element/terminal, servers, such as content or web servers (such as a Hypertext Transfer Protocol (HTTP) server), personal digital assistants (PDAs), laptop or desktop computers, tablet computers, digital cameras, digital recording devices, video gaming devices, video game consoles, cellular or satellite radio telephones, digital media players, and/or the like.

The communications network 1404 may be any suitable type of communication network. For example, the communications network 1404 may be a multiple access system that provides content, such as voice, data, video, messaging, broadcast, etc., to multiple wireless users. The communications network 1404 may enable multiple wireless users to access such content through the sharing of system resources, including wireless bandwidth. For example, the communications network 1404 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like. The communication network 1404 may include multiple connected communication networks. The communication network 1404 may include the Internet and/or one or more private commercial networks such as cellular networks, WiFi hotspots, Internet Service Provider (ISP) networks, and/or the like.

Affine Mode.

In HEVC, only a translational motion model is applied for motion compensated prediction. While in the real world, there are many kinds of motion, e.g. zoom in/out, rotation, perspective motions and other irregular motions. In the VTM-2.0, an affine motion compensated prediction is applied. The affine motion model is either 4-parameter or 6-parameter. A first flag for each inter coded CU is signaled to indicate whether the translation motion model or the affine motion model is applied for inter prediction. If it is an affine motion model, a second flag is signaled to indicate whether it is a 4-parameter or 6-parameter model.

Figure 7B:
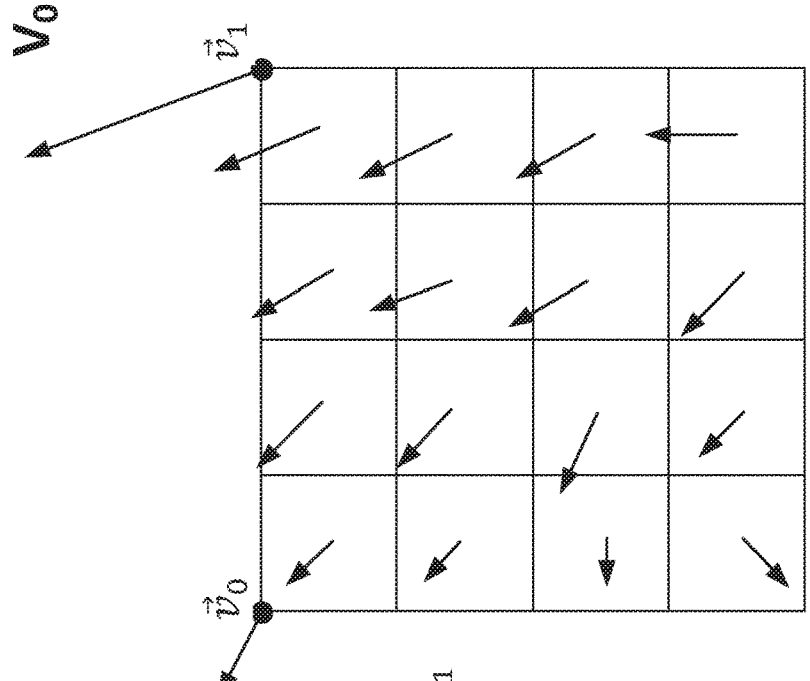
FIGS. 7A-7B illustrate a four-parameter affine model. The affine model is shown in FIG. 7A and the sub-block level motion derivation for affine blocks is shown in FIG. 7B.
Figure 7A:
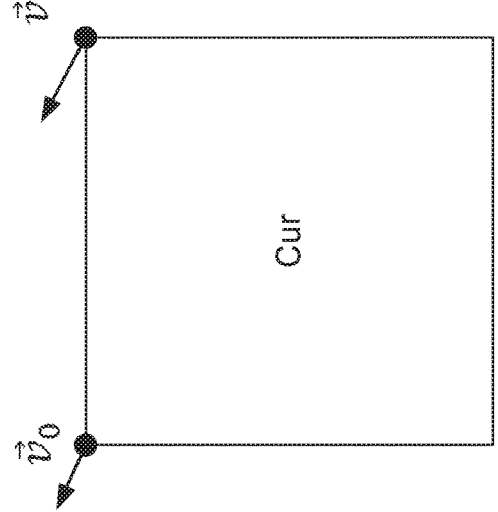

The affine motion model with four parameters has the following parameters: two parameters for translation movement in horizontal and vertical directions, one parameter for zoom motion for both directions, and one parameter for rotation motion for both directions. The horizontal zoom parameter is equal to the vertical zoom parameter. The horizontal rotation parameter is equal to the vertical rotation parameter. These four-parameter affine motion models are coded in VTM using two motion vectors at two control point positions defined at the top-left corner and top-right corner of the current CU. As shown in FIGS. 7A-7B, the affine motion field of the block is described by two control point motion vectors ($V_0$, $V_1$). Based on the control point motion, the motion field ($v_x$, $v_y$) of an affine coded block is described as $$v_x = \frac{(v_{1x} - v_{0x})}{w}x - \frac{(v_{1y} - v_{0y})}{w}y = v_{0x} \quad (1)$$
$$v_y = \frac{(v_{1y} - v_{0y})}{w}x + \frac{(v_{1x} - v_{0x})}{w}y = v_{0x}$$

Where ($v_{0x}$, $v_{0y}$) is motion vector of the top-left corner control point, and ($v_{1x}$, $v_{1y}$) is motion vector of the top-right corner control point, as shown in FIG. 7A, and w is the width of CU. In VTM-2.0, the motion field of an affine coded CU is derived at the 4×4 block level; that is, ($v_x$, $v_y$) is derived for each of the 4×4 blocks within the current CU and applied to the corresponding 4×4 block.

Those four parameters of 4-parameter affine model may be estimated iteratively. Denote the MV pairs at step k as $\{(v_{0x}^k, v_{0y}^k), (v_{1x}^k, v_{1y}^k)\}$, the original luminance signal as $I(i,j)$, and the prediction luminance signal as $I'_k(i,j)$. The spatial gradients $g_x(i,j)$ and $g_y(i,j)$ may be derived with a Sobel filter applied on the prediction signal $I'_k(i,j)$ in the horizontal and vertical direction, respectively. The derivative of Eq (1) can be represented as:

$$\begin{cases} dv_x^k(x, y) = c*x - d*y + a \\ dv_y^k(x, y) = d*x + c*y + b \end{cases} \quad (2)$$

where (a, b) are delta translational parameters and (c, d) are delta zoom and rotation parameters at step k. The delta MV at control points can be derived with its coordinates as Eq. (3),(4). For example, (0, 0), (w, 0) are coordinates for top-left and top-right control points, respectively.

$$\begin{cases} dv_{0x}^k = v_{0x}^{k+1} - v_{0x}^k = a \\ dv_{0y}^k = v_{0y}^{k+1} - v_{0y}^k = b \end{cases} \quad (3)$$

$$\begin{cases} dv_{1x}^k = (v_{1x}^{k+1} - v_{1x}^k) = c*w + a \\ dv_{1y}^k = (v_{1y}^{k+1} - v_{1y}^k) = d*w + b \end{cases} \quad (4)$$

Based on the optical flow equation, the relationship between the change of luminance and the spatial gradient and temporal movement is formulated as:

$$I'_k(i,j) - I(i,j) = g_x(i,j)*dv_x^k(i,j) + g_y(i,j)*dv_y^k(i,j) \quad (5)$$

Substituting $dv_x^k(i,j)$ and $dv_y^k(i,j)$ with Eq. (2), we get the equation for parameter (a, b, c, d).

$$I'_k(i,j) - I(i,j) = (g_x(i,j)*i + g_y(i,j)*j)*c + (-g_x(i,j)*j + g_y(i,j) \\ *i)*d\ g_x(i,j)*a + g_y(i,j)*b \quad (6)$$

Since all samples in the CU satisfy Eq. (6), the parameter set (a, b, c, d) can be solved using least square error method. The MVs at two control points $\{(v_{0x}^{k+1}, v_{0y}^{k+1}), (v_{1x}^{k+1}, v_{1y}^{k+1})\}$ at step (k+1) can be solved with Eq. (3) and (4), and they are rounded to a specific precision (e.g. ¼ pel). Using the iteration, the MVs at two control points can be refined until it converges when parameters (a, b, c, d) are all zeros or the iteration times meets a pre-defined limit.

Figure 8:
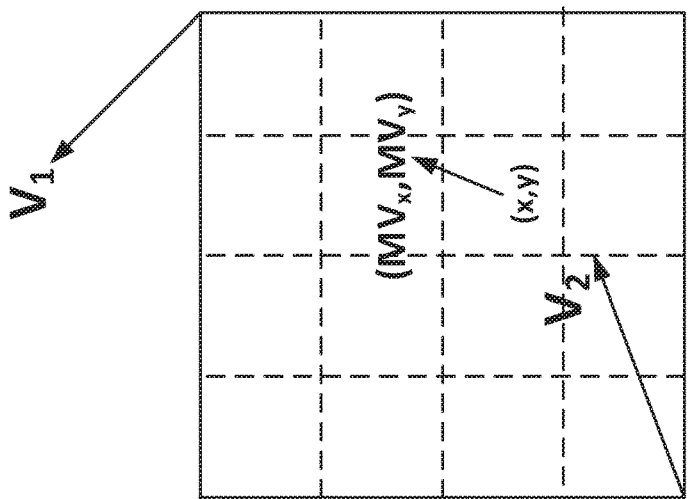
FIG. 8 illustrates a six-parameter affine mode: $V_0$, $V_1$, and $V_2$ are control points; $(MV_x, MV_y)$ is motion vector of the sub-block centered at position (x, y).

The affine motion model with six parameters has the following parameters: two parameters for translational movement in the horizontal and vertical directions, one parameter for zoom motion in the horizontal direction, one parameter for rotational motion in the horizontal direction, one parameter for zoom motion in the vertical direction, and one parameter for rotational motion in vertical direction. The 6-parameter affine motion model is coded with three MVs at three control points. As shown in FIG. 8, three control points for 6-parameter affine coded CU are defined at the top-left, top-right and bottom left corner of the CU. The motion at the top-left control point is related to translational motion, the motion at top-right control point is related to rotation and zoom motion in the horizontal direction, and the motion at bottom-left control point is related to rotation and zoom motion in the vertical direction. For the 6-parameter affine motion model, the rotation and zoom motion in horizontal direction may not be same as those motions in the vertical direction. The motion vector of each sub-block ($v_x$, $v_y$) is derived using three MVs at control points as:

$$v_x = v_{0x} + (v_{1x} - v_{0x})*\frac{x}{w} + (v_{2x} - v_{0x})*\frac{y}{h} \quad (7)$$
$$v_y = v_{0y} + (v_{1y} - v_{0y})*\frac{x}{w} + (v_{2y} - v_{0y})*\frac{y}{h}$$

where ($v_{2x}$, $v_{2y}$) is motion vector of the bottom-left control point, (x, y) is the center position of sub-block, w and h are the width and height of CU.

The six parameters of 6-parameter affine model are estimated in a similar way. Eq. (2) is changed as follows.

$$\begin{cases} dv_x^k(x, y) = c*x + d*y + a \\ dv_y^k(x, y) = e*x + f*y + b \end{cases} \quad (8)$$

where (a, b) are delta translation parameters, (c, d) are delta zoom and rotation parameters for the horizontal direction, and (e, f) are delta zoom and rotation parameters for the vertical direction, at step k. Equation (8) is changed accordingly.

$$I'_k(i,j) - I(i,j) = (g_x(i,j)*i)*c + (g_x(i,j)*j)*d + (g_y(i,j)*i)*e + \\ (g_y(i,j)*j)*f + g_x(i,j)*a + g_y(i,j)*b \quad (9)$$

The parameter set (a, b, c, d, e, f) can be solved using least square method by considering all samples within a CU. The MV of top-left control point ($v_{0x}^{k+1}$, $v_{0y}^{k+1}$) is calculated with Eq. (3). The MV of top-right control point ($v_{1x}^{k+1}$, $v_{1y}^{k+1}$) is calculated with Eq. (10). The MV of top-right control point ($v_{2x}^{k+1}$, $v_{2y}^{k+1}$) is calculated with Eq. (11).

$$\begin{cases} dv_{1x}^k = (v_{1x}^{k+1} - v_{1x}^k) = c*w + a \\ dv_{1y}^k = (v_{1y}^{k+1} - v_{1y}^k) = e*w + b \end{cases} \quad (10)$$

$$\begin{cases} dv_{2x}^k = (v_{2x}^{k+1} - v_{2x}^k) = d*h + a \\ dv_{2y}^k = (v_{2y}^{k+1} - v_{2y}^k) = f*h + b \end{cases} \quad (11)$$

Prediction Refinement with Optical Flow (PROF).

Affine motion model parameters can be used to derive the motion vector of each pixel in a CU. However, due to the high complexity and memory access bandwidth for generating pixel-based affine motion compensated prediction, the current VVC uses a sub-block based affine motion compensation method, where a CU is divided into 4×4 sub-blocks, each of which is assigned with a MV derived from the affine CU's control point MVs. The sub-block based affine motion compensation is a trade-off between coding efficiency, complexity and memory access bandwidth. It loses prediction accuracy due to sub-block based prediction.

To achieve a finer granularity of motion compensation, prediction refinement with optical flow (PROF) was proposed in JVET-N0236 to refine the sub-block based affine motion compensated prediction using optical flow. After the sub-block based affine motion compensation is performed, a luma prediction sample is refined by adding a difference derived by the optical flow equation. The proposed PROF is described as following four steps.

Step 1. The sub-block-based affine motion compensation is performed to generate sub-block prediction I(i,j).

Step 2. The spatial gradients $g_x(i,j)$ and $g_y(i,j)$ of the sub-block prediction are calculated at each sample location using a 3-tap filter [−1, 0, 1].

$$g_x(i,j)=I(i+1,j)-I(i-1,j)$$

$$g_y(i,j)=I(i,j+1)-I(i,j-1)$$

The sub-block prediction is extended by one pixel on each side for the gradient calculation. To reduce the memory bandwidth and complexity, the pixels on the extended borders are copied from the nearest integer pixel position in the reference picture. Therefore, additional interpolation for padding region is avoided.

Figure 9:
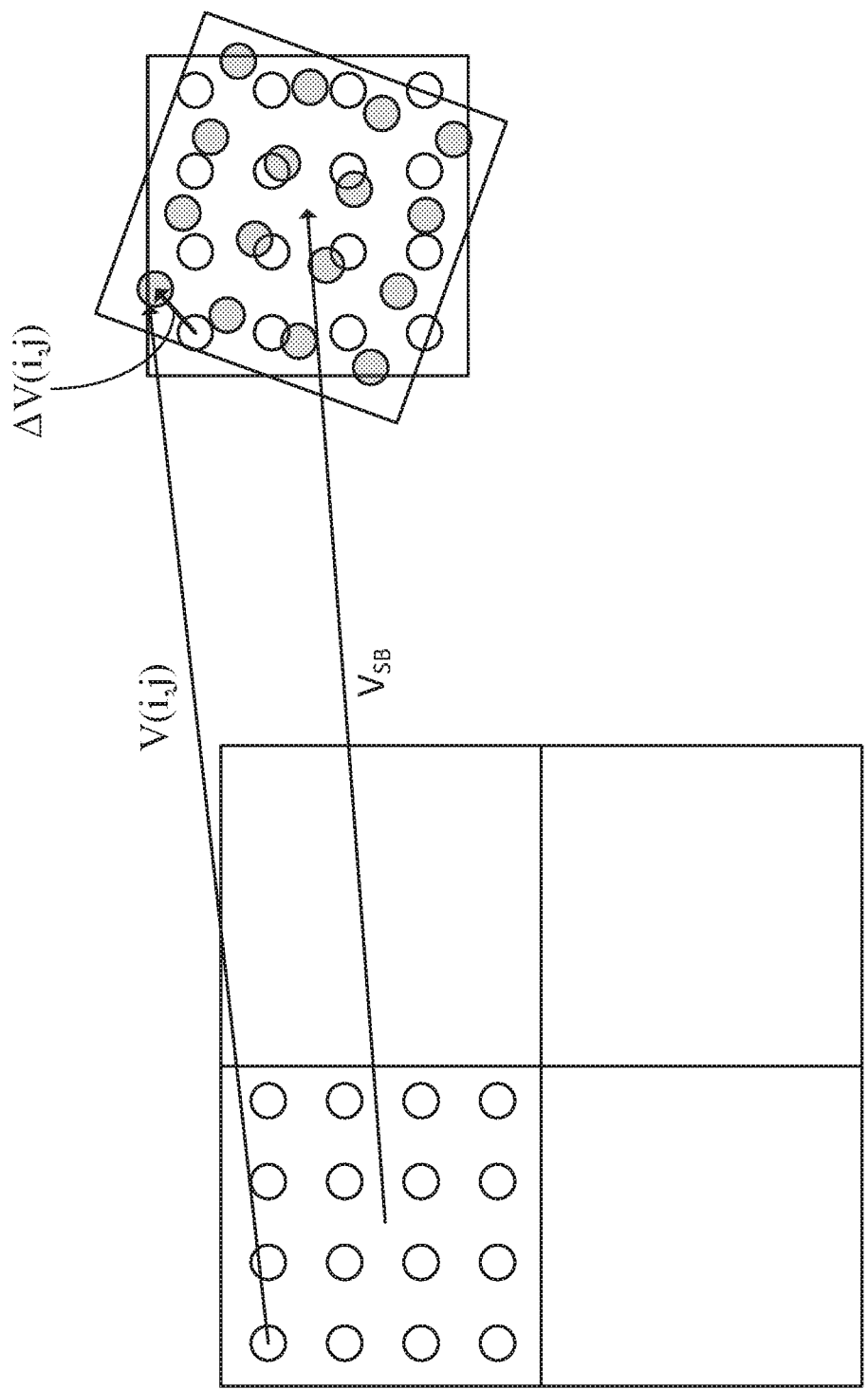
FIG. 9 illustrates a sub-block MV $V_{sb}$ and pixel $\Delta V(i, j)$ used in prediction refinement with optical flow (PROF).

Step 3. The luma prediction refinement is calculated by the optical flow equation.

$$\Delta I(i,j)=g_x(i,j)*\Delta v_x(i,j)+g_y(i,j)*\Delta v_y(i,j)$$

where the $\Delta v(i, j)$ is the difference between a sample-specific MV computed for sample location (i,j), denoted by v(i,j), and the sub-block MV of the sub-block to which pixel (i,j) belongs, as shown in FIG. 9.

Since the affine model parameters and the pixel location relative to the sub-block center are not changed from sub-block to sub-block, $\Delta v(i,j)$ can be calculated for the first sub-block and reused for other sub-blocks in the same CU. Let x and y be the horizontal and vertical offset from the pixel location to the center of the sub-block, $\Delta v(x, y)$ can be derived by the following equation, $$\begin{cases} \Delta v_x(x, y) = c*x + d*y \\ \Delta v_y(x, y) = e*x + f*y \end{cases}$$

For a 4-parameter affine model, $$\begin{cases} c = f = \frac{v_{1x} - v_{0x}}{w} \\ e = -d = \frac{v_{1y} - v_{0y}}{w} \end{cases}$$

For a 6-parameter affine model, $$\begin{cases} c = \frac{v_{1x} - v_{0x}}{w} \\ d = \frac{v_{2x} - v_{0x}}{h} \\ e = \frac{v_{1y} - v_{0y}}{w} \\ f = \frac{v_{2y} - v_{0y}}{h} \end{cases}$$

where ($v_{0x}$, $v_{0y}$), ($v_{1x}$, $v_{1y}$), ($v_{2x}$, $v_{2y}$) are the top-left, top-right and bottom-left control point motion vectors, w and h are the width and height of the CU.

Step 4. Finally, the luma prediction refinement is added to the sub-block prediction I (i,j). The final prediction I' is generated as the following equation.

$$I'(i,j)=I(i,j)+\Delta I(i,j)$$

Issues Addressed in Some Embodiments.

In modern video coding standards, such as AVC, HEVC, and WC, motion vector precision can be higher than integer precision. When the motion vector has a fractional component, the prediction at the fractional pixel position is generated by interpolation. The interpolation operation may use additional samples from neighboring integer pixel positions, which increases the memory access bandwidth. The length of the interpolation filter affects prediction efficiency. In AVC, the interpolation filter for the luma component is 6-tap. The minimum PU size is 8×8. The interpolation filter for luma component is increased to 8 tap for HEVC in order to improve the coding efficiency.

For HEVC, some limitations are applied to small PUs to reduce the worst-case memory access bandwidth. For example, the 4×4 PU for both uni-prediction and bi-prediction is disallowed and 4×8 and 8×4 PUs only allow uni-prediction. In WC, the length of the interpolation filter for the luma component is kept as 8-tap. The minimum PU size is 4×4. For non-affine mode, a 4×4 PU only allows uni-prediction, and the 4×8 and 8×4 PUs allow both uni-prediction and bi-prediction. The worst case of memory access bandwidth of WC is 4×8 or 8×4 bi-prediction, which is about 47% higher than the worst-case memory access bandwidth of HEVC (8×8 bi-prediction). The memory access bandwidth affects the design of a codec chip, such as area and the working frequency of the data bus. Higher bandwidth generally entails higher cost. It can be beneficial to reduce the worst-case memory access bandwidth while preserving the coding efficiency. Different solutions have been proposed to address this problem, such as using a shorter tap interpolation filter for those small PUs, or using padding to limit the memory access while keeping the same interpolation filter length. Both methods compromise the coding efficiency. The shorter tap interpolation filter introduces a new interpolation filter, which brings an implementation burden. The padding method has a large computational complexity since the length of the interpolation filter is not reduced.

Some of the systems and methods described herein operate to reduce the worst-case memory access bandwidth and to reduce computational complexity. Systems and methods are further described to compensate coding efficiency loss.

Overview of Example Embodiments

Systems and methods described herein operate to reduce the memory access bandwidth for inter prediction, especially to reduce the worst-case memory access bandwidth. Usually the worst-case memory access bandwidth appears for small blocks of samples (such as small PUs). Systems and methods described herein may further reduce computational complexity as compared to conventional interpolation-based motion compensation.

In some embodiments, in a motion compensation process, the motion vector is first rounded to integer precision. An initial (unrefined) prediction is generated through copying from the integer position pointed by the rounded motion vector in the reference picture, without interpolation. A sample intensity error is estimated by applying optical flow with the spatial gradient of the unrefined prediction and the delta motion vector between the actual MV before rounding and the rounded MV as input. The final prediction is refined by adding the pixel intensity error to unrefined prediction.

Inter Prediction Bandwidth Reduction Methods.

In some embodiments, a method is used to reduce the memory access bandwidth by applying a pixel intensity error determined using the optical flow equation. Such methods can reduce the memory access bandwidth by avoiding interpolation operations used to generate a prediction signal in sub-pixel positions. An example of a method as proposed herein may be implemented using the following steps.

In a rounding process, a block-based motion vector is rounded to integer precision. The rounded motion vector is used to perform motion compensation by copying those corresponding integer samples from the reference picture. Since the motion vector is integer precision, there is no need to perform interpolation. Reference pixels in integer positions can be directly used to generate a prediction (before refinement), referred to here as an unrefined prediction.

The spatial gradients $g_x(i,j)$ and $g_y(i,j)$ of unrefined prediction samples are calculated at each sample location. In one example, the spatial gradients can be generated using the same process as the gradient generation used in bi-directional optical flow. For example, the horizontal gradient at a sample location is calculated as the difference between its right neighboring sample and its left neighboring sample, while the vertical gradient at a sample location is calculated as the difference between its bottom neighboring sample and its top neighboring sample. In another example, the spatial gradients can be generated using a Sobel filter.

A motion vector rounding error is calculated by:

$$\begin{cases} \Delta v_x(i,j) = v_x(i,j) - v'_x(i,j) \\ \Delta v_y(i,j) = v_y(i,j) - v'_y(i,j) \end{cases} \quad (12)$$

Where $(v_x, v_y)$ and $(v'_x, v'_y)$ are the MV and the rounded MV, respectively, at pixel location (i,j). For a non-affine coded block, all pixels in the same block share the same MV. Therefore, the motion vector rounding error is the same for all pixels in the same motion compensation block. For an affine coded block, each pixel may have different MV, so the motion vector rounding error of each pixel may be different.

The pixel intensity change is calculated by the optical flow equation as a scalar product of the gradient and the motion vector rounding error.

$$\Delta I(i,j) = g_x(i,j)*\Delta v_x(i,j) + g_y(i,j)*\Delta v_y(i,j) \quad (13)$$

The prediction is refined by adding the luminance intensity change. The final prediction I' is generated as the following equation.

$$I'(i,j) = I(i,j) + \Delta I(i,j) \quad (14)$$

where I(i,j) is unrefined prediction.

In one embodiment, in the rounding process, instead of rounding the motion vector to an integer precision, the motion vector is rounded to a different precision lower than the original precision. For example, if the motion vector precision is 1/16-pel precision, it can be rounded to 1/2-pel precision. In this case, interpolation may still be used. But a shorter tap filter may be used, for example a 4-tap filter or bilinear (2-tap) filter, to generate the sub-pixel. In this case, the memory bandwidth reduction ratio may be reduced, but the motion vector error is also reduced. Therefore, prediction accuracy may be improved.

In another embodiment, a longer gradient filter can be used to compensate the accuracy lost by removing the interpolation or reducing the length of interpolation filter. In this case, the padding for the extended unrefined prediction block, which is used for gradient calculation with a longer gradient filter, may be used in order not to increase the memory access bandwidth too much.

The proposed methods can reduce the memory bandwidth by avoiding interpolation operation or using a filter with a shorter length in the motion compensation. The computational complexity can also be reduced accordingly.

In some embodiments, in order to reduce the worst-case memory access bandwidth, the bandwidth reduction methods described herein may only be applied to the motion compensation of small blocks (e.g. PUs or CUs), such as 4×4, 4×8, 8×4 uni-prediction/bi-prediction. In some embodiments, the methods described herein are applied only to the motion compensation of blocks having an area or a number of samples that does not exceed a threshold, such as an area threshold of 32 samples. In some embodiments, the methods described herein are applied only to blocks whose horizontal size does not exceed a threshold. In some embodiments, the methods described herein are applied only to blocks whose vertical size does not exceed a threshold. In some embodiments, the methods described herein are applied only to blocks for which the greater of the horizontal or vertical size of the block does not exceed a threshold.

The memory access bandwidth for other larger blocks (e.g. PUs or CUs) is not the bottleneck, and conventional motion compensation may still be applied.

Correcting for Use of Sub-Block Motion Vectors.

In some embodiments, bandwidth reduction methods as described herein are combined with the PROF for affine prediction. In some such embodiments, the sub-block motion vector is derived from the control point motion vectors. The sub-block motion vector is then rounded to integer precision. Prediction is obtained by motion compensation with the rounded MV (e.g. integer precision). The motion vector error Δv(i, j) is the sum of the sub-block motion vector rounding error and the motion vector difference between the pixel MV and the sub-block MV. Then the PROF is applied with the Δv(i, j) and unrefined prediction as input. When combined with PROF, the memory access bandwidth and computational complexity for affine motion compensation may be greatly reduced.

In some such embodiments, a motion vector v(i,j) is determined for a current sample in a current block based on an affine motion model. The affine motion model may be determined based on control point motion vectors for the current block. A sub-block motion vector is also determined for each sub-block in the current block. The sub-block motion vector may be rounded to generate a rounded sub-block motion vector. An unrefined prediction for the current sample is obtained using the rounded motion sub-block motion vector. An error vector is determined for the current sample by subtracting the rounded sub-block motion vector from the motion vector v(i,j) for the respective sample. A spatial gradient is obtained at a sample position of the current sample. A refined prediction of the current sample is obtained based on the unrefined prediction, the spatial gradient, and the error vector. For example, the refined prediction may be obtained by adding, to the unrefined prediction, a scalar product between the spatial gradient and the error vector.

Example Methods and Systems

As illustrated in FIG. 10, a method performed in some embodiments includes rounding (1002) a first motion vector associated with a current sample to generate a second motion vector. An unrefined prediction of the current sample is generated (1004) or otherwise obtained using the rounded second motion vector. A rounding error vector is determined (1006) or otherwise obtained that is indicative of a difference between the first motion vector and the second motion vector. A spatial gradient of sample values is determined (1008) or otherwise obtained at a sample position of the current sample. A refined prediction of the current sample is obtained based on the unrefined prediction, the spatial gradient, and the rounding error vector. To obtain the refined prediction, a scalar product may be determined (1010) between the spatial gradient and the rounding error vector, and the scalar product may be added (1012) to the unrefined prediction to generate a refined prediction of the current sample. The method of FIG. 10 may be repeated for a plurality of current samples with in a current block of samples in a video. The method of FIG. 10 may be implemented as part of an encoding process or as part of a decoding process.

In some embodiments, an apparatus comprises one or more processors configured to perform: rounding a first motion vector associated with a current sample to generate a second motion vector; generating an unrefined prediction of the current sample using the second motion vector; determining a rounding error vector representing a difference between the first motion vector and the second motion vector; determining a spatial gradient of sample values at a sample position of the current sample; and generating a refined prediction of the current sample by adding, to the unrefined prediction, a scalar product between the spatial gradient and the rounding error vector. Such an apparatus may be implemented in an encoder and/or a decoder.

In some embodiments, an apparatus includes a module for rounding a first motion vector associated with a current sample to generate a second motion vector; a module for generating an unrefined prediction of the current sample using the second motion vector; a module for determining a rounding error vector representing a difference between the first motion vector and the second motion vector; a module for determining a spatial gradient of sample values at a sample position of the current sample; and a module for generating a refined prediction of the current sample by adding, to the unrefined prediction, a scalar product between the spatial gradient and the rounding error vector. Such an apparatus may be implemented in an encoder and/or a decoder. In an encoder, these modules may be implemented at motion prediction module 210 (FIG. 2A). In a decoder, these modules may be implemented at motion compensated prediction module 260 (FIG. 2B).

In some embodiments, a signal is provided encoding a video, where the signal is generated with a method that includes rounding a first motion vector associated with a current sample to generate a second motion vector; generating an unrefined prediction of the current sample using the second motion vector; determining a rounding error vector representing a difference between the first motion vector and the second motion vector; determining a spatial gradient of sample values at a sample position of the current sample; and generating a refined prediction of the current sample by adding, to the unrefined prediction, a scalar product between the spatial gradient and the rounding error vector. The signal may encode a residual value representing a difference between the refined prediction of the current sample and an input sample value in a video.

Some embodiments include an apparatus comprising: an accessing unit configured to access data including a signal as described above, and a transmitter configured to transmit the data. Some embodiments include a method comprising: accessing data including a signal as described above and transmitting the data.

In some embodiments, a device includes: an apparatus as described herein, such as an apparatus configured to perform the method of FIG. 10, and at least one of (i) an antenna configured to receive a signal, the signal including data representative of the image, (ii) a band limiter configured to limit the received signal to a band of frequencies that includes the data representative of the image, or (iii) a display configured to display the image. In some such embodiments, the device may be a TV, a cell phone, a tablet, or an STB.

In some embodiments, a computer-readable medium is provided that stores a signal as described above.

In some embodiments, a computer-readable medium is provided including instructions for causing one or more processors to perform: rounding a first motion vector associated with a current sample to generate a second motion vector; generating an unrefined prediction of the current sample using the second motion vector; determining a rounding error vector representing a difference between the first motion vector and the second motion vector; determining a spatial gradient of sample values at a sample position of the current sample; and generating a refined prediction of the current sample by adding, to the unrefined prediction, a scalar product between the spatial gradient and the rounding error vector.

In some embodiments, a computer program product is provide that includes instructions which, when the program is executed by one or more processors, causes the one or more processors to carry out a method that includes: rounding a first motion vector associated with a current sample to generate a second motion vector; generating an unrefined prediction of the current sample using the second motion vector; determining a rounding error vector representing a difference between the first motion vector and the second motion vector; determining a spatial gradient of sample values at a sample position of the current sample; and generating a refined prediction of the current sample by adding, to the unrefined prediction, a scalar product between the spatial gradient and the rounding error vector.

Further Embodiments

In some embodiments, inter prediction of a sample (such as a luma sample) in a current block is performed by rounding an initial motion vector and determining a rounding error vector caused by the rounding. An unrefined prediction of the sample is generated using the rounded motion vector. Where the initial motion vector has been rounded to an integer precision, the unrefined prediction may be generated by copying, from a reference picture, a sample value at the position indicated by the rounded motion vector. Such copying may be performed without interpolation. Unrefined predictions are similarly generated for other samples in the current block. Based on the unrefined predictions, a spatial gradient is determined for each sample position in the block. A refined prediction is generated for each sample position by adding, to the unrefined prediction, a scalar product between the spatial gradient and the rounding error vector at the sample position. Example methods can reduce the number of reference pixels used to predict a current block and thus may reduce memory access bandwidth.

In some embodiments, a method is provided of coding a video comprising a plurality of blocks including a current bock. The method includes, for each of a plurality of samples in the current block: generating an unrefined prediction of the sample using a rounded motion vector associated with the sample; and generating a refined prediction of the sample by adding, to the unrefined prediction, a scalar product between (i) a spatial gradient at the sample position and (ii) a rounding error vector associated with the sample. The rounded motion vector may be generated by rounding an initial motion vector associated with the current sample. The rounded motion vector is rounded to integer precision or to a fractional precision. The rounding error vector may be calculated by subtracting the rounded motion vector from the initial motion vector.

In some such embodiments, the initial motion vector is a sub-block motion vector for a sub-block containing the sample, and the initial motion vector is generated using an affine motion model. In other embodiments, the initial motion vector is a translational motion vector associated with the current block.

The spatial gradient of the sample may be based at least in part on unrefined predictions of a plurality of neighboring samples. For example, a horizontal component of the spatial gradient may be calculated as the difference between a right-neighboring sample and a left neighboring sample, and wherein a vertical component of the spatial gradient may be calculated as the difference between a bottom-neighboring sample and a top-neighboring sample. In some embodiments, spatial gradient may be calculated using a Sobel filter. In some embodiments, the current block may be padded for purposes of calculating the spatial gradient.

In some embodiments, generating an unrefined prediction of the sample is performed using a four-tap filter. In some embodiments, generating an unrefined prediction of the sample is performed using a bilinear filter. In some embodiments, where the rounded motion vector is rounded to integer precision, generating an unrefined prediction of the sample may be performed by copying a sample value from a reference block.

In some embodiments, a determination of whether to perform the prediction methods described herein (as opposed to using conventional translational or affine inter prediction) is based on a size of the current block. For example, in some embodiments, the prediction methods described herein are performed only in response to a determination that the current block is 4×4, 4×8, or 8×4.

In some embodiments using affine prediction, the rounding error vector includes not only an error component due to rounding, but also an error component attributable to the differences between a sample-specific motion vector and a sub-block motion vector. In some such embodiments, an initial motion vector associated with the sample is generated by determining, using an affine motion model, a sub-block motion vector for a sub-block that includes the initial motion vector. The rounded motion vector is generated by rounding the initial motion vector. The rounding error vector may be determined as a sum of (i) an error generated by the rounding of the initial motion vector and (ii) a motion vector difference between the sub-block motion vector and a sample-specific motion vector.

In some embodiments using affine prediction, an initial motion vector associated with the sample is generated by determining, using an affine motion model, a sub-block motion vector for a sub-block that includes the initial motion vector. The rounded motion vector is generated by rounding the initial motion vector. A sample-specific motion vector for the sample is calculated using the affine motion model. The rounding error vector is calculated such that it represents a difference between (i) a sample-specific motion vector for the sample based on the affine motion model and (ii) the rounded motion vector.

In some embodiments, a method is provided of coding a video comprising a plurality of blocks including a current bock. The method includes identifying at least one initial motion vector, each sample in the current block corresponding to one of the initial motion vectors; rounding each of the initial motion vectors to generate a corresponding rounded motion vector; generating an unrefined prediction of each sample in the current block using, for each sample, the rounded motion vector corresponding to that sample; at each sample position in the current block, calculating a spatial gradient based on the unrefined predictions; for each of the rounded motion vectors, calculating corresponding rounding error vector by subtracting the respective rounded motion vector from its corresponding initial motion vector; calculating an intensity change for each sample in the current block, the intensity change being a scalar product of (i) the spatial gradient at the respective sample position and (ii) the rounding error vector corresponding to the sample; and generating a refined prediction of each sample in the current block by adding the corresponding intensity change to each respective unrefined prediction.

In some embodiments, the current block is predicted using bi-prediction. In such embodiments, the method may further include: generating two refined predictions of each sample in the current block from different reference pictures; and averaging the two refined predictions to generate a bi-prediction of each sample.

In some embodiments, the methods described herein are performed by an encoder. The encoder may operate to: subtract the refined prediction of the current block from an input block to generate a prediction residual; and encode the prediction residual in a bitstream. The initial motion vector may also be signaled in the bitstream.

In some embodiments, the methods described herein are performed by a decoder. The decoder may operate to:

decode a prediction residual from a bitstream; and add the prediction residual to the refined prediction of the current block to generate a reconstructed block. The initial motion vector may be signaled in the bitstream.

Some embodiments include a processor and a non-transitory computer-readable medium storing instructions operative to perform the methods described herein. Some embodiments include a non-transitory computer-readable storage medium storing a video bitstream generated using the methods described herein.

This disclosure describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the disclosure or scope of those aspects. Indeed, all of the different aspects can be combined and interchanged to provide further aspects. Moreover, the aspects can be combined and interchanged with aspects described in earlier filings as well.

The aspects described and contemplated in this disclosure can be implemented in many different forms. While some embodiments are illustrated specifically, other embodiments are contemplated, and the discussion of particular embodiments does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present disclosure, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

The terms HDR (high dynamic range) and SDR (standard dynamic range) often convey specific values of dynamic range to those of ordinary skill in the art. However, additional embodiments are also intended in which a reference to HDR is understood to mean "higher dynamic range" and a reference to SDR is understood to mean "lower dynamic range". Such additional embodiments are not constrained by any specific values of dynamic range that might often be associated with the terms "high dynamic range" and "standard dynamic range".

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various numeric values may be used in the present disclosure, for example. The specific values are for example purposes and the aspects described are not limited to these specific values.

Embodiments described herein may be carried out by computer software implemented by a processor or other hardware, or by a combination of hardware and software. As a non-limiting example, the embodiments can be implemented by one or more integrated circuits. The processor can be of any type appropriate to the technical environment and can encompass one or more of microprocessors, general purpose computers, special purpose computers, and processors based on a multi-core architecture, as non-limiting examples.

Various implementations involve decoding. "Decoding", as used in this disclosure, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this disclosure, for example, extracting a picture from a tiled (packed) picture, determining an upsampling filter to use and then upsampling a picture, and flipping a picture back to its intended orientation.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions.

Various implementations involve encoding. In an analogous way to the above discussion about "decoding", "encoding" as used in this disclosure can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this disclosure.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. A mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this disclosure are not necessarily all referring to the same embodiment.

Additionally, this disclosure may refer to "determining" various pieces of information. Determining the information can include one or more of, for example, estimating the information, calculating the information, predicting the information, or retrieving the information from memory.

Further, this disclosure may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this disclosure may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items as are listed.

Also, as used herein, the word "signal" refers to, among other things, indicating something to a corresponding decoder. For example, in certain embodiments the encoder signals a particular one of a plurality of parameters for region-based filter parameter selection for de-artifact filtering. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

Implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination, across various claim categories and types. Further, embodiments can include one or more of the following features, devices, or aspects, alone or in any combination, across various claim categories and types:

Modifying the motion compensated prediction process applied in the decoder and/or encoder.

Enabling several advanced motion compensated prediction methods in the decoder and/or encoder.

A bitstream or signal that includes syntax conveying information generated according to any of the embodiments described.

Creating and/or transmitting and/or receiving and/or decoding according to any of the embodiments described.

A method, process, apparatus, medium storing instructions, medium storing data, or signal according to any of the embodiments described.

A TV, set-top box, cell phone, tablet, or other electronic device that performs motion compensated prediction according to any of the embodiments described.

A TV, set-top box, cell phone, tablet, or other electronic device that performs motion compensated prediction according to any of the embodiments described, and that displays (e.g. using a monitor, screen, or other type of display) a resulting image.

A TV, set-top box, cell phone, tablet, or other electronic device that selects (e.g. using a tuner) a channel to receive a signal including an encoded image, and performs motion compensated prediction according to any of the embodiments described.

A TV, set-top box, cell phone, tablet, or other electronic device that receives (e.g. using an antenna) a signal over the air that includes an encoded image, and performs motion compensated prediction according to any of the embodiments described.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:
   rounding a first motion vector associated with a current sample to obtain a second motion vector;
   obtaining an unrefined prediction of the current sample using the second motion vector;
   obtaining a rounding error vector having a value equal to a difference between the first motion vector and the second motion vector;
   obtaining a spatial gradient at a sample position of the current sample; and
   obtaining a refined prediction of the current sample based on the unrefined prediction, the spatial gradient, and the rounding error vector.

2. An apparatus comprising one or more processors configured to perform:
   rounding a first motion vector associated with a current sample to obtain a second motion vector;
   obtaining an unrefined prediction of the current sample using the second motion vector;
   obtaining a rounding error vector having a value equal to a difference between the first motion vector and the second motion vector;
   obtaining a spatial gradient at a sample position of the current sample; and
   obtaining a refined prediction of the current sample based on the unrefined prediction, the spatial gradient, and the rounding error vector.

3. The method of claim 1, wherein the second motion vector is rounded to integer precision.

4. The method of claim 1, wherein the second motion vector is rounded to a fractional precision.

5. The method of claim 1, wherein the first motion vector is a sub-block motion vector for a sub-block containing the current sample, and wherein the first motion vector is obtained using an affine motion model.

6. The method of claim 1, wherein the first motion vector is a translational motion vector associated with a current block containing the current sample.

7. The method of claim 1, wherein obtaining the spatial gradient at a sample position of the current sample is performed based on unrefined predictions of a plurality of samples neighboring the current sample.

8. The method of claim 1, wherein a horizontal component of the spatial gradient is obtained as a difference between a right-neighboring sample and a left-neighboring sample of the current sample, and wherein a vertical component of the spatial gradient is obtained as a difference between a top-neighboring sample and a bottom-neighboring sample of the current sample.

9. The method of claim 1, wherein obtaining the unrefined prediction of the current sample is performed using a four-tap interpolation filter.

10. The method of claim 1, wherein obtaining the unrefined prediction of the current sample is performed using a bilinear interpolation filter.

11. The method of claim 1, wherein a determination to perform rounding of the first motion vector is made based on a size of a current block including the current sample.

12. The method of claim 1, wherein a determination to perform rounding of the first motion vector is made based on a determination that a current block including the current sample is a 4×4, 4×8, or 8×4 block.

13. The method of claim 1, wherein the first motion vector is signaled in a bitstream.

14. The method of claim 1, wherein the refined prediction of the current sample is subtracted from an input sample value to generate a prediction residual, and wherein the prediction residual is encoded in a bitstream.

15. The method of claim 1, wherein a prediction residual for the current sample is decoded from a bitstream and added to the refined prediction of the current sample to generate a reconstructed sample value.

16. The method of claim 1, wherein the refined prediction of the current sample is obtained by adding, to the unrefined prediction, a scalar product between the spatial gradient and the rounding error vector.

17. The apparatus of claim 2, wherein the first motion vector is a translational motion vector associated with a current block containing the current sample.

18. The apparatus of claim 2, wherein obtaining the spatial gradient at a sample position of the current sample is performed based on unrefined predictions of a plurality of samples neighboring the current sample.

19. The apparatus of claim 2, wherein a horizontal component of the spatial gradient is obtained as a difference between a right-neighboring sample and a left-neighboring sample of the current sample, and wherein a vertical component of the spatial gradient is obtained as a difference between a top-neighboring sample and a bottom-neighboring sample of the current sample.

20. The apparatus of claim 2, wherein a determination to perform rounding of the first motion vector is made based on a size of a current block including the current sample.

\* \* \* \* \*